United States Patent
Argyropoulos et al.

(10) Patent No.: US 8,802,771 B2
(45) Date of Patent: Aug. 12, 2014

(54) TWO COMPONENT POLYURETHANE COATING COMPOSITIONS COMPRISING ISOCYANURATE COMPOSITIONS FROM BIS(ISOCYANATOMETHYL) CYCLOHEXANE AND FROM ALIPHATIC DIISOCYANATES

(75) Inventors: John N. Argyropoulos, Midland, MI (US); Debkumar Bhattacharjee, Blue Bell, PA (US); Donald C. Schall, Lansdale, PA (US); Allen Xu, Shanghai (CN); Aaron Yang, Shanghai (CN); Louie Luo, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 275 days.

(21) Appl. No.: 13/297,388

(22) Filed: Nov. 16, 2011

(65) Prior Publication Data

US 2012/0130016 A1  May 24, 2012

(30) Foreign Application Priority Data

Nov. 22, 2010 (CN) .......................... 2010 1 0591091

(51) Int. Cl.
| | |
|---|---|
| *C08F 8/30* | (2006.01) |
| *C08F 283/04* | (2006.01) |
| *C08G 18/08* | (2006.01) |
| *C08G 18/28* | (2006.01) |
| *C08J 3/00* | (2006.01) |
| *C08K 3/20* | (2006.01) |
| *C08L 75/00* | (2006.01) |

(52) U.S. Cl.
USPC ........... 524/590; 524/507; 524/589; 524/591; 524/839; 524/840; 525/123; 525/455

(58) Field of Classification Search
USPC ................. 524/507, 589, 590, 591, 839, 840; 525/123, 455
See application file for complete search history.

(56) References Cited

U.S. PATENT DOCUMENTS

| | | | |
|---|---|---|---|
| 4,443,597 A | 4/1984 | Kamatani et al. |
| 5,508,377 A | 4/1996 | Yamashita et al. |
| 5,663,272 A | 9/1997 | Slack et al. |
| 6,028,158 A | 2/2000 | Slack et al. |
| 6,090,939 A | 7/2000 | Richter et al. |
| 6,252,121 B1 | 6/2001 | Argyropoulos et al. |
| 6,479,564 B1 | 11/2002 | Schwalm et al. |
| 6,590,098 B2 | 7/2003 | Richter et al. |
| 6,653,432 B2 | 11/2003 | Dallemer et al. |
| 6,875,243 B2 | 4/2005 | Ewald et al. |
| 7,030,266 B2 | 4/2006 | Koecher et al. |
| 2006/0155095 A1 | 7/2006 | Daussin et al. |
| 2008/0033086 A1 | 2/2008 | Jimenez et al. |
| 2009/0156738 A1 | 6/2009 | Laas et al. |
| 2010/0222505 A1 | 9/2010 | Moravek et al. |

FOREIGN PATENT DOCUMENTS

| | | |
|---|---|---|
| EP | 1155062 A1 | 11/2001 |
| JP | 6088043 A | 3/1994 |
| JP | 09328476 A | 12/1997 |
| JP | 11171966 A | 6/1999 |
| JP | 2006519302 A | 8/2006 |
| WO | 2004/078820 A1 | 9/2004 |
| WO | 2004096882 A1 | 11/2004 |
| WO | 2004096883 A1 | 11/2004 |
| WO | 2008068197 A1 | 6/2008 |
| WO | 2009035856 A1 | 3/2009 |
| WO | WO 2009/035856 * 3/2009 |

* cited by examiner

*Primary Examiner* — Patrick Niland
(74) *Attorney, Agent, or Firm* — Andrew E. C. Merriam

(57) ABSTRACT

The present invention provides two-component polyurethane compositions comprising, as one component, polyisocyanate compositions of the isocyanurate of one or more bis(isocyanatomethyl)cyclohexane or, preferably, a mixture of two or more of these, and of the isocyanurate of hexamethylene diisocyanate (HDI trimer), and, as the other component, a mix of a soft polyol having a hydroxyl functionality of from 2.5 to 5.0 and a molecular weight of from 500 to 3,000, and a hard polyol. Such compositions provide coatings, especially clear topcoats, which exhibit excellent scratch and mar and solvent resistance in addition to a good balance of hardness and flexibility without the need for increasing the volatile organic content (VOC) of the compositions. Also provided are compositions of a polyisocyanate compositions of the isocyanurate of one or more bis(isocyanatomethyl)cyclohexane with soft polyol which have lower VOCs.

10 Claims, No Drawings

TWO COMPONENT POLYURETHANE COATING COMPOSITIONS COMPRISING ISOCYANURATE COMPOSITIONS FROM BIS(ISOCYANATOMETHYL) CYCLOHEXANE AND FROM ALIPHATIC DIISOCYANATES

The present invention relates to two component polyurethanes comprising, as one component, two or more polyisocyanate compositions each having one or more isocyanurate and, as a second component, one or more polyol, particularly in clear coat applications.

There remains a need for polyurethane coating compositions that offer a combination of good film hardness, flexibility, solvent resistance and scratch and mar resistance when cured at ambient or slightly elevated temperatures, especially for low volatile organic compound (VOC) content compositions. In one known way to improve the hardness of PU coatings, a portion of a conventional polyisocyanate crosslinking agent, the trimer of hexamethylene diisocyanate (HDI) has been replaced with a relatively hard or rigid material, such as the trimer of isophorone diisocyanate (IPDI). Unfortunately, the IPDI trimer has a much slower curing rate than that of HDI and leads to coatings with poor solvent resistance under ambient cure conditions due to lower crosslink density. Also, IPDI trimer has an adverse impact on the flexibility and scratch and mar resistance of the coating produced with it.

Recently, patent application US 2006/0155095 A1, to Daussin et al., discloses polyisocyanate compositions comprising isocyanurates from bis(isocyanatomethyl)cyclohexane. Also disclosed is the reaction of this polyisocyanate composition with an acrylic polyol to make a coating. However, the composition in Daussin et al. does not provide the excellent solvent resistance desired in combination with all of the above-mentioned properties.

The present inventors have endeavored to solve the problem of providing two-component polyurethane compositions that provide coatings with good hardness, flexibility, solvent resistance, scratch and mar resistance and weatherability while at the same time enabling reduced viscosity in coating compositions that contain the same or a lesser amount of solvent or VOCs than known compositions.

STATEMENT OF THE INVENTION

In accordance with the present invention, two-component polyurethane coating compositions comprise as one component one or more polyisocyanate composition of an isocyanurate of bis(isocyanatomethyl)-cyclohexane and one or more polyisocyanate composition of an isocyanurate of hexamethylene diisocyanate (HDI), and, as a separate component, a blend of one or more hard polyol having a glass transition temperature (Tg) of 0° C. or above, preferably, an acrylic polyol, and one or more soft polyol having a Tg of −20° C. or below and having a hydroxyl functionality of 2.5 to 5.0 and a number average molecular weight of from 500 to 3,000, preferably a polyester polyol.

In the polyisocyanate component, the weight ratio of one or more composition of an isocyanurate of bis(isocyanatomethyl)cyclohexane to one or more composition of an isocyanurate of an aliphatic diisocyanate is from 99.9:0.1 to 10:90, or 95:5 or less, or, preferably from 25:75 to 75:25, or, more preferably, from 40:60 to 60:40.

In the polyol blend component, the weight ratio of the soft polyol to the hard polyol ranges from 10:90 to 99.9:0.1, or up to 95:5.

The polyisocyanate compositions of isocyanurates of bis(isocyanatomethyl)cyclohexane may optionally be formed from a mixture of structural isomers of bis-(isocyanatomethyl)cyclohexanes, such as, for example, a 1,3-(isocyanatomethyl)cyclohexane and a 1,4-(isocyanatomethyl)cyclohexane, or from a mixture of geometric isomers of bis-(isocyanatomethyl)cyclohexanes, such as, for example, cis and trans 1,3-(isocyanatomethyl)cyclohexanes, or cis- and trans-1,4-(isocyanatomethyl)cyclohexanes.

Preferably, the one or more soft polyol has a Tg of −30° C. or below.

Preferably, the one or more soft polyol has a hydroxyl functionality of 2.9 to 4.0, or, more preferably, 3.0 or higher.

Preferably, the soft polyol is a polyester polyol. More preferably, the soft polyol may be an oil based polyol, for example, a seed oil based polyol, having a non-reactive, hydrophobic pendant group, such as a 6 to 36 carbon alkyl group.

In addition, the present invention provides coating compositions comprising the two-component polyurethane coating compositions.

In another embodiment, the present invention provides coatings made from the coating compositions as well as coated substrates bearing such coatings. The coated substrates may be chosen from plastic, metal and wood articles, such as automotive substrates, structural substrates, machinery and heavy mass parts. In one embodiment, the coatings are multi-layer coatings comprising the polyurethane coatings of the present invention as the topcoat, a base coat, such as a polyester or acrylic coating, e.g. a color coat, and, optionally, a primer coat, e.g. an epoxy.

In another aspect of the present invention, the two-component polyurethane coating compositions comprise, as one component, one or more polyisocyanate composition of an isocyanurate of a bis-(isocyanatomethyl)cyclohexane trimer and, as the other component, one or more soft polyol having a Tg of −20° C. or below having a hydroxyl functionality of 2.5 to 5.0 and a number average molecular weight of from 500 to 3,000. In such an aspect, the compositions may have a VOC content of 479.4 g/L or less, preferably, 359.5 g/L or less, or, more preferably, 300 g/L or less. Such compositions may further comprise one or more polyisocyanate composition of an isocyanurate from another aliphatic diisocyanate.

All ranges are inclusive and combinable. For example, a hydroxyl functionality of 2.5 to 5.0, or 2.9 to 4.0, or 3.0 or higher includes ranges of from 2.5 to 2.9, from 2.5 to 3.0, from 2.5 to 4.0, from 2.9 to 3.0, from 2.9 to 4.0, from 2.9 to 5.0, from 3.0 to 4.0, from 3.0 to 5.0, and from 4.0 to 5.0

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

Unless otherwise specified, all temperature units refer to room temperature (~20-22° C.) and all pressure units refer to standard pressure.

As used herein, unless otherwise indicated, the term "glass transition temperature" or "Tg" refers to the glass transition temperature of a material as determined by Differential Scanning calorimetry (DSC) scanning between −90° C. to 150° C. while heating at a rate of 10° C./min. The Tg is the inflection point of the curve of heat flow vs. temperature or the maximum value on the plot of its derivative.

As used herein, unless otherwise indicated, the term "calculated glass transition temperature" or "calculated Tg" refers to the glass transition temperature of a material as determined by the Fox Equation as described by Fox in *Bulletin of the American Physical Society*, 1, 3, page 123 (1956).

As used herein, unless otherwise indicated, the term "molecular weight" of a polyol refers to a formula weight or number average molecular weight calculated from the hydroxyl equivalent weight, as determined by titration in accordance with ASTM D4274 (2005), wherein the polyol is reacted with phthalic anhydride to form a carboxyl group for titration, using phenolphthalein indicator in methanol as titrants, which equivalent weight is multiplied by the hydroxyl functionality of the polyol.

As used herein, unless otherwise indicated, the term "polyisocyanate" refers to any isocyanate functional molecule having two or more isocyanate groups.

As used herein, unless otherwise indicated, the term "trimer" refers to molecules containing one or more isocyanurate ring structure and the word "trimer" is synonymous with "isocyanurate". For purposes of this invention, a polyisocyanate containing one isocyanurate ring structure is referred to herein as "IR1". Molecules containing two isocyanurate ring structures are referred to herein as "IR2". As a general class, unless otherwise noted, compounds containing 2 or more isocyanurate rings based on the polyisocyanates of the present invention are referred to as "oligomeric trimers".

The present inventors have found that two-component polyurethane coating compositions having, as one component, a polyisocyanate composition of one or more isocyanurate of bis(isocyanatomethyl)cyclohexane and a polyisocyanate composition of one or more isocyanurate of an aliphatic diisocyanate, e.g. HDI, and, as the second component, blends of a hard polyol and a soft polyol can provide ambient cured coatings or coatings that cure at slightly elevated temperatures, of, for example, 30 to 80° C., with excellent hardness, scratch and mar resistance, solvent resistance, impact resistance and flexibility while at the same time, lowering the VOC content of coating composition and coatings made therefrom. Such compositions are especially useful in making clearcoats, such as topcoats for automotive coatings applications and for ambient cure coatings for heavy mass parts or substrates. Coatings made from two or more isocyanurates of bis(isocyanatomethyl)cyclohexane further provide excellent gloss retention and distinctness of image (DoI).

In addition, the present inventors have found that two-component polyurethane coating compositions wherein one component comprises a polyisocyanate composition of an isocyanurate of one or more bis-(isocyanatomethyl)cyclohexane and the second component comprises one or more soft polyol will provide excellent hardness, impact resistance and flexibility properties, as well as improved gloss retention. This is so even though the second component comprises a soft polyol.

The polyisocyanate compositions disclosed herein generally contain isocyanurate group-containing polyisocyanates as well as other polyisocyanates, such as dimers and buirets, as well as the isocyanurates themselves, and dimers and oligomers of any or all of these. As used herein, the term "polyisocyanate composition of an isocyanurate" and "trimer composition" are synonymous.

In formulating two-component polyurethane coating compositions according to the present invention, the weight ratio of the one or more bis(isocyanatomethyl)cyclohexane trimer composition to the composition one or more aliphatic diisocyanate trimer composition will vary as a function of the ratio of the high Tg polyol to the low Tg polyol. With solely a soft polyol, one may use solely polyisocyanate composition of an isocyanurate of one or more bis(isocyanatomethyl)cyclohexane. To maintain the desired properties as one adds in more hard polyol, one adds in more polyisocyanate compositions of trimers of aliphatic diisocyanates, e.g. HDI.

Suitable compositions for the polyol component may comprise up to 100 wt. % of soft polyol where the polyisocyanate component contains only one or more bis(isocyanatomethyl) cyclohexane trimer containing mixture. Preferably, the weight ratio of soft polyol to hard polyol ranges from 20:80 to 80:20, or, more preferably, 30:70 to 70:30.

Suitable mole ratios of the polyisocyanate component, which may contain several different trimers, to the polyol or polyol blend component may range in known proportions, such as, for example, from 0.7:1:0 to 1.4 to 1.0, or 0.8:1.0 or higher and 1.2:1.0 or lower.

Polyisocyanate compositions of an isocyanurate of a bis-(isocyanatomethyl)cyclohexane may be made from a mixture of from 0.1 to 99.9 wt. % of any 1,3-bis(isocyanatomethyl)cyclohexane with from 0.1 to 99.9 wt. % of any 1,4-bis (isocyanatomethyl)cyclohexane, or such mixtures containing 5 wt. % or more of any 1,4-bis(isocyanatomethyl)cyclohexane, or, preferably, 30 to 80 wt. % of any 1,4-bis(isocyanatomethyl)cyclohexane, or, more preferably, 40 wt. % or more, and up to 70 wt. %. In general, polyisocyanate isocyanurate compositions that are made from 1,3-bis(isocyanatomethyl)cyclohexane provide harder, less flexible coatings; whereas the isocyanurate compositions made with 1,4-bis(isocyanatomethyl)-cyclohexanes add flexibility to coatings produced therefrom.

Polyisocyanate compositions of isocyanurates of bis(isocyanatomethyl)-cyclohexane may be prepared by methods known in the art, for example, as disclosed in U.S. patent publication no. 2006/0155095A1, to Daussin et al., by trimerizing (i) 1,3-bis(isocyanatomethyl)cyclohexane or 1,4-bis (isocyanatomethyl)cyclohexane or (ii) an isomeric mixture of two or more isocyanates chosen from cis-1,3-bis(isocyanatomethyl)cyclohexane, trans-1,3-bis(isocyanotomethyl)cyclohexane, cis-1,4-bis(isocyanotomethyl)-cyclohexane and trans-1,4-bis(isocyanotomethyl)cyclohexane in the presence of one or more trimerization catalyst, such as, for example, a tertiary amine or phosphine or a heterogeneous catalyst, and, if desired, in the presence of solvents and/or assistants, such as co-catalysts, expediently at elevated temperature, until the desired NCO content has been reached, and then deactivating the catalyst using inorganic and organic acids, the corresponding acid-halides and alkylating agents and, preferably, heating. The polyisocyanate isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified to contain urethane, urea, biuret, allophanate, imino-s-triazine, uretonimine or carbodiimide moieties.

Suitable bis(isocyanatomethyl)cyclohexane raw materials may be manufactured in a known manner from, for example, the Diels-Alder reaction of butadiene and acrylonitrile, subsequent hydroformylation, then reductive amination to form the amine, cis-1,3-bis(aminomethyl)cyclohexane, trans-1,3-bis(aminomethyl)cyclohexane, cis-1,4-bis(aminomethyl)cyclohexane and trans-1,4-bis(aminomethyl)cyclohexane, followed by reaction with phosgene to form a cycloaliphatic diisocyanate mixture. The preparation of the bis(aminomethyl)cyclohexane is described, for example, in U.S. Pat. No. 6,252,121, to Argyropoulos et al.

Any two or more bis(isocyanatomethyl)cyclohexanes, or one or more of these with one or more aliphatic diisocyanate may be mixed prior to the trimerization step, or the trimer containing polyisocyanate mixtures of the individual diisocyanates may be formed and then blended together. For example, trimer containing mixtures of 1,3- and 1,4-isomers of bis(isocyanatomethyl)cyclohexane may be separately produced and the products mixed, or each of one or more 1,3- and one or more 1,4-isomer thereof can be present together before the trimerization step. In a similar manner, the polyisocyanate isocyanurate compositions containing aliphatic diisocyanates can be produced by having these diisocyanates present prior to trimerization or produced separately and blended in with the polyisocyanate isocyanurate compositions produced from one or more bis(isocyanatomethyl)-cyclohexane isomers. It is generally preferred to produce isocyanurate polyisocyanates from the 1,3- and 1,4-isomers when both isomers are present in the initial reaction mixture.

Suitable aliphatic diisocyanate compositions for making isocyanurate compositions of such diisocyanates include, for example, C2-C8 alkylene diisocyanates, such as tetramethylene diisocyanate and hexamethylene diisocyanate (HDI).

The production of the polyisocyanate isocyanurate compositions of the present invention preferably is carried out in the absence of an organic solvent.

Generally the trimerization reaction is carried out until the unreacted monomer content is 80 wt. % or less, based on the total weight of monomer raw materials, preferably 70 wt. % or less, or 65 wt. % or less, for example, from 20 to 40 wt. %. Preferably, the composition of an isocyanurate of bis(isocyanatomethyl)cyclohexane contains an IR1 content of 30 wt. % or less, based on the weight of the total composition, more preferably, 40 wt. % or less and, most preferably, 50 wt. % or less.

In another aspect of the polyisocyanate compositions of isocyanurates as in the present invention, the polyisocyanate compositions may be modified, for example, as disclosed in U.S. patent publication no. 2006/0155095A1, to Daussin et al., by the addition of a compound containing one or more groups reactive to isocyanate, such as a hydroxyl or primary or secondary amine group. Such modified polyisocyanate compositions may comprise the reaction of one or more bis (isocyanotomethyl)cyclohexane and/or aliphatic diisocyanate with one or more monol, such as a C1 to C8 monol or an alkyloxypolyalkylene glycol, diol, diamine, monoamine, or aminoalcohol and a trimerization catalyst in situ resulting in an alkane, polyalkylene oxide, polyester or polytetramethylene oxide modified polyisocyanate composition, Where the polyisocyanate compositions are modified by a monol or other compound containing one group reactive to isocyanates, partially or fully blocked isocyanates or isocyanurates are formed and these may be activated by heating to deblock. Typical blocking groups are caprolactam, the oxime of methyl ethyl ketone, phenol and phenolic compounds, imidazole and pyrazole.

The modified trimer can be further modified by various procedures known to those skilled in the art. One such modification is to incorporate allophanate or biuret linkages, which further increases the molecular weight of the final product. The allophanate or biuret extended trimers can be prepared, for example, as disclosed in U.S. patent publication no. 2006/0155095A1, to Daussin et al., by heating the modified trimers under agitation to elevated temperatures. If desired, a catalyst which promotes allophanate or biuret formation can be added.

Alternatively, a polyisocyanate prepolymer composition formed by reaction of bis(isocyanotomethyl)cyclohexane and/or aliphatic diisocyanate with a monol, diol, diamine, or monoamine, can be modified by the reaction of additional isocyanate to form allophanate or biuret modified prepolymers which can then be mixed with a trimerization catalyst giving an allophanate or biuret modified polyisocyanate isocyanurate composition. Preparation of such allophanate or biuret prepolymers, followed by trimerization, is known in the art, see for example, U.S. Pat. Nos. 5,663,272 and 6,028,158.

Two isocyanurate-ring ureas can be formed by reaction of the isocyanurate with water, the resulting ureas can be converted via reaction with residual isocyanate to form biurets.

In accordance with the present invention, soft polyols may have a glass transition temperature (Tg) −20° C. or less, or, preferably, −35° C. or less, or, −50° C. or less, or, −60° C. or less, or, as low as −70° C. Soft polyols generally can replace VOCs and can enable one to provide compositions with solids contents as high as 75 wt. % based on the total weight of the two component compositions.

In a polyol blend with a hard polyol, the soft polyol may be any polyol having the desired glass transition temperature (Tg) and the desired hydroxyl functionality.

In the other aspect to insure ultraviolet light (UV) stability, where the polyol component comprises only one or more soft polyol, the soft polyol should be a polyol other than a polyether polyol.

Suitable soft polyols, with any exceptions noted above, may include, for example, any polyol having the requisite hydroxyl functionality and molecular weight, such as polyester polyols, polyester polyols chosen from caprolactone, any polyester/polyether hybrid polyols, polyether polyols from polytetramethylene glycol (PTMEG); polyether polyols comprising on ethylene oxide, propylene oxide, butylene oxide subunits and mixtures thereof; polycarbonate polyols; polyacetal polyols; polyesteramide polyols; polythioether polyols; and polyolefin polyols, such as saturated or unsaturated polybutadiene polyols.

The molecular weight of a soft polyol according to the present invention may range from 500 to 3,000, preferably, 1,000 or more, or, preferably, 2,000 or less. Controlling the molecular weight of the soft polyol enables better control of composition viscosity.

The hydroxyl functionality of a soft polyol according to the present invention may range from 2.5 to 5.0, or, up to 4.5, or, preferably, 2.9 or more, or, preferably 3.0 or higher, or, preferably, up to 4.0. The hydroxyl functionality of the soft polyol should be low enough to insure lower viscosity, thereby enabling one to lower the VOC of the compositions of the present invention, while at the same time being high enough to insure that coatings and products formed from the compositions have adequate solvent resistance and other properties, such as good hardness.

Soft polyols may be made by conventional means, such as by bulk polymerization to form polyester(amide)s, e.g. from diacids or difunctional anhydrides or their salts with hydroxyl containing reactants, poly(thio)ethers, polyacetals, polycarbonates or polylactones or by reacting oligomeric or polymeric polyols or polyethers, e.g. polyoxyalkylenes, or reactive hydrogen containing polyol oligomers in the presence of carboxyl, lactone, esteramide or carbonate containing reactants.

Suitable soft polyols having a hydroxyl functionality of 2.5 to 5.0 can be formed by methods known in the art, such as by polymerization or reaction, e.g. endcapping, in the presence small amounts, e.g. 0.1-5.0 wt. %, based on the weight of all reactants used to make the polyol, of triols or higher hydroxyl functional reactants, e.g. glycerol or trimethylolpropane, or, if the intermediate compounds are amine, hydroxyl or thiol functional, reaction in the presence of small amounts of tri- or higher acid functional carboxylic acids, e.g. citric acid, to form branched polymers which are then reacted with, for example, an excess of diols to insure hydroxyl functional end groups.

In another aspect of soft polyols according to the present invention, oil based soft polyols having a hydroxyl functionality of 2.5 or higher and having a hydrophobic pendant group, e.g. a 4 to 36 carbon alkyl group, may be made may be obtained from natural or synthetic animal and/or vegetable oils, fats, fatty acids or fatty glycerides, such as soy and castor oils, by methods known in the art, such as, for example, as disclosed in PCT publication Nos. WO 2004/096882 and 2004/096883. Preferred are vegetable (seed) oils that have at least about 70 percent unsaturated fatty acids in the triglyceride such as soy, canola or sunflower oils. Several chemistries can be used to prepare such oil based polyols, including modifications by, but not limited to, for example, epoxidation, hydroxylation, ozonolysis, esterification, hydroformylation, or alkoxylation. Such modifications are commonly known in the art. For example, one such method comprises transesterifying fatty acids or fatty glycerides, with a suitable alcohol, such as methanol, to form fatty acid alkyl esters, followed by reductive hydroformylation of carbon-carbon double bonds in the constituent fatty acids esters to form hydroxymethyl groups, and then forming a polyester polyol or polyether/polyester by reacting the hydroxymethylated fatty acid esters with an initiator compound which is a polyol, such as a diol or triol, or polyamine. In this process, polyol molecular weight advances both by condensation of the monomers with the glycol initiator and by self condensation of the hydroformylated fatty acids esters. By controlling average functionality of the hydroformylated fatty acids esters and their ratio to the glycol initiator, both polyol molecular weight and average functionality can be systematically controlled.

Suitable initiators may include, for example, glycols having from 2 to 36 carbon atoms, such as, for example, ethylene glycol and 1,2-propylene glycol; diamines, such as ethylene diamine; triols, such as, for example, glycerol, 1,2,6-hexanetriol and trimethylolpropane; and others, such as, for example, pentaerythritol, sucrose, sorbitol, and diethylene triamine; and mixtures thereof. Exemplary initiators may contain reactive primary hydroxyl groups, such as 1,6-hexanediol and UNOXOL™ Diol. UNOXOL™ Diol is a liquid cycloaliphatic diol that is an approximately 50:50 mixture of 1,3-cyclohexanedimethanol and 1,4-cyclohexanedimethanol, which is a mixture of cis and trans isomers.

Suitable initiators may be alkoxylated with ethylene oxide or a mixture of ethylene oxide and at least one other alkylene oxide to give an alkoxylated initiator.

As used herein, the term "pendant group" refers to an alkyl functional group that is extended from the backbone of an oil based polyol, and does not contain any reactive groups, e.g. one or more hydroxyl groups. The pendant groups are free to associate with each other once the inventive coating is generated. Preferably, the pendant groups are 6 to 36 carbon alkyl groups.

In accordance with the present invention, hard polyols have a glass transition temperature (Tg) of 0° C. or more, or 10° C. or more, or, preferably, 20° C. or more, or 30° C. or less, or up to 70° C. If the Tg of the hard polyol is too high, then suitable compositions require excessive solvent for workability and/or film formation.

Suitable hard polyols may include any polyacrylate polyol in an organic solvent, such as those formed by conventional means, such as, for example, organic solvent solution polymerization each in the presence of a free radical initiator, e.g. a peracid or its salt, or formed by aqueous polymerization and subsequent dissolution in organic solvent. In such polyols, the hydroxyl functionality may be provided by hydroxyl functional vinyl or acrylic monomers, such as hydroxyethyl methacrylate (HEMA) or allyl alcohol.

Other suitable polyols having a glass transition temperature (Tg) of 0° C. or above may be aromatic group containing polyesters, polyesteramides, or polycarbonates, such as are formed in a conventional manner via bulk polymerization using at least some aromatic reactants, e.g. terephthalic acid.

The two-component polyurethane coating compositions of the present invention may further comprise conventional additives such as, for example, colorants, pigments and fillers, light stabilizers, UV absorbing compounds, flow aids, wetting and dispersing additives, defoamers, rheology modifiers and catalysts, such as dialkyl tin salts of fatty acids in amounts of up to 1000 ppm based on total coating composition solids.

Coatings according to the present invention may be applied to a desired substrate by conventional means. Such coatings can be cured at ambient temperatures, or at temperatures ranging from sub ambient to 150° C., preferably ambient conditions to 80° C. Cure temperatures may be varied depending on the substrate, so that heat sensitive plastics can be coated and the coatings cured at 120° C. or less. In addition, coatings applied in the field, such as maintenance coatings and coatings of bridges, heavy machinery and heavy mass parts may be cured at ambient temperatures. Curing times generally range from 30 minutes (at elevated temperatures) to 1-7 days, and are longer at ambient or lower temperatures.

The two-component polyurethane compositions of the present invention are particularly useful for producing paints and varnishes, and coatings. The compositions of the present invention are particularly suited for top coats. End-use applications include, but are not limited to, furniture such as tables, cabinets; building materials such as wood floors, pipes; appliances such as refrigerator handles; automotive exterior parts, and interior parts, and consumer products such as cellphones, bags, and plastic casings.

The present invention further provides polyurethane coatings made from the two-component polyurethane coating compositions on any of the substrates mentioned above. Such coatings can be multilayer coatings over a primer layer and, optionally, a basecoat or color coat.

Coatings in accordance with the present invention may have any or all of a direct impact resistance measured in accordance with ASTM D 2794-93 (2004) of 50 kg-cm, or greater, preferably, 100 kg-cm, or greater, a Pencil hardness measured in accordance with ASTM-D 3363 of F, or greater, preferably, H, or greater, a Konig hardness measured in accordance with ASTM-D 4366 of 50 seconds, or greater, preferably 100 seconds, or greater, a solvent resistance measured in accordance with ASTM-D 5402-06 (2006) of 100 MEK double rubs, or greater, preferably, 200 MEK double rubs, or greater, or a scratch and mar resistance, as measured by gloss retention, of 20%, or greater, preferably 50%, or greater.

EXAMPLES

The following examples are provided to illustrate the present invention. The test methods used in the examples are described, as follows:

Film thickness of the coatings was determined by following ASTM D 1186. Direct impact resistance of the coating was determined by using a Gardner impact tester (Paul N. Gardner Co, Inc, Pompano Beach, Fla.) and following ASTM D 2794-93 (2004). An acceptable direct impact resistance level for a coating is 50 kg-cm, or more. Konig hardness of the coating films were determined according to ASTM-D 4366 (1995) by using a pendulum hardness tester and is reported in seconds. Konig hardness in the range of an acceptable hardness level for a coating is from 50 seconds to 200 seconds, or 50 seconds or more. Examples of unacceptable levels of hardness are below 50 seconds.

The pencil hardness of the coating films were measured by following ASTM D 3363 (2005) using pencils with leads ranging in hardness from 6B to 4H (Paul N. Gardner Co). An acceptable pencil hardness level for a coating is F or more. Examples of unacceptable levels of hardness are B or less.

The solvent resistance of the coating films were measured in accordance with ASTM-D 5402-06 (2006) and reported as the number of methyl ethyl ketone (MEK) double rubs that were required to cut through the coating to the substrate. The double rubs were performed using an AATCC Crockmeter (Atlas Electrical Devices Co, Chicago, Ill.) by attaching a cheesecloth square to the cylinder at the end of the sliding arm and soaking with MEK. An acceptable solvent resistance level for a coating is greater than 100 double rubs, preferably, 200 or more.

The scratch and mar resistance of the coatings was measured by coating a black Leneta chart, curing the coating and measuring the 60 degree gloss of the coating, taking=5 readings across the coating and reporting the average value measured for each reading using a BYK Gardner micro-TRI-gloss meter (Cat #4520; Serial #982069). Using a felt pad, BonAmi™ dry cleanser, and an Atlas Crockmeter (SDL Atlas LLC, Rock Hill, S.C.) to run 10 double rubs on the coating, rinse off the coating using water and dry. Then, remeasuring the gloss of the coating as before and calculating the percent retention of gloss. An acceptable scratch and mar resistance level for a coating is 20% gloss retention or more.

The gloss retention of the coating films was determined in accordance with ASTM D 6625-01 (2007) using a Q-U-V Accelerated Weathering Tester (The Q-Panel Company, Cleveland, Ohio) and the UVB-313 fluorescent lamps. An acceptable gloss retention level for a coating is 50% or more, after 1000 hours exposure in a repeating 12 hour cycle (8 hours UV and 4 hours condensing humidity cycle).

For the Test results in Tables 11, 13 and 15, below, the following additional or alternative test methods were used:

Impact resistance was measured according to ASTM D5420 using a Gardner impact tester (Paul N. Gardner Co).

MEK double rubs were carried out according to solvent resistance rub test ASTM D4752 using methyl ethyl ketone (MEK) as the solvent with the number of rubs reported before a blister in or breakthrough of the film occurs. The rubs are counted as a double rubs, i.e. one rub forward and one rub backward constitutes a double rub. This test method is used to determine the curing degree of coating film and its resistance to a specific solvent.

Gloss was measured according to ASTM D523 using a BYK Micro-Tri-Gloss meter.

DoI (distinctness of Image) was measured according to ASTM D5767 using BYK Micro-Wave-Scan meter. Both gloss and DoI are using Black scrub test plastic panels from Leneta as a substrate.

Gel content was measured by Soxhlet extraction using acetone as solvent and extraction time is 6 hours. This test method was used to determine the cross linking degree of the final coating films and reflects the reactivity of the compositions used in the coating formulations. During the measurement, a bag made from qualitative filtration paper was weighed ($W_1$ g). A piece of the coating film, weight of ~0.5-1.0 g was put in the bag, and weighed ($W_2$ g), giving a sample amount of ($W_2-W_1$, g). The bag was sealed, weighed again ($W_3$ g), and put into the Soxhlet extraction apparatus. After the acetone was refluxed for 6 hours, the bag was taken out and dried first in a hood and then in a vacuum oven at 40° C. until constant weight ($W_4$ g). The gel content was calculated as:

$$\text{Gel \%} = \left(1 - \frac{W_3 - W_4}{W_2 - W_1}\right) \times 100\%.$$

Synthesis Examples 1 and 2

Oil Based Soft Polyols NOP-1 and NOP-2

Natural oil polyols (NOP-1 and NOP-2) were produced from a natural oil monomer obtained by reductive hydroformylation of soy oil derived fatty acid methyl esters. The natural oil monomer was separated into streams by fractional distillation with average hydroxyl functionalities of 1.0-1.9. A batch of NOP-1 was prepared from 62.52 kg of natural oil monomer with an average functionality of 1.9, 12.3 kg of UNOXOL Diol, and 0.045 kg of tin (II) 2-ethylhexanoate. Reagents were added to reactor and the kettle inerted with nitrogen gas. While stirring, the temperature of the reaction is raised to 190° C. and methanol is distilled off with the aide of a dry nitrogen sweep to effect polycondensation. The reaction was terminated upon achieving the desired hydroxyl number and product collected. In the same manner, a batch of NOP-2 was prepared from 6.67 kg of natural oil monomer with an average functionality of 1.5, 1.34 kg of UNOXOL Diol, and 0.004 kg of tin (II) 2-ethylhexanoate.

Synthesis Example 3

Trimer 1

To make Trimer 1, a 1.8 L hastelloy reactor equipped with a gas bubbler, mechanical stirrer, thermometer and condenser are added 1600 grams of a 1:1 w/w mix of 1,3 bis(isocyanatomethyl)cyclohexane and 1,4- or bis(isocyanatomethyl)cyclohexane containing a mixture of cis- and trans-isomers of each compound. Dry nitrogen is bubbled through the stirred reaction mixture while it is heated at 70° C. For example 35, 1.9 grams of a 75 percent solution of quaternary ammonium carboxylate in ethyleneglycol are added to the reaction mixture. The reaction temperature is maintained between 70 and 75° C. When the reaction mixture reaches an NCO content of 30 percent, the reaction is stopped by adding 0.5 g of chloroacetic acid. The excess monomer is separated in a short path distillation unit to provide a clear product. The resulting trimer containing composition is dissolved in butylacetate to obtain a product containing 30 wt percent butylacetate, an NCO equivalent weight of 347 and a free monomer content of less than 0.5 wt percent. Analysis of the oligomer distribution indicates the product contains 48 percent IR1, 22 percent IR2 and 30 percent higher MW polyisocyanates, including trimer oligomers.

Trimer 2: The triisocyanurate of hexamethylene diisocyanate (HDI) commercially available from Bayer (Leverkusen, Del.) as Desmodur™ N 3600 with an NCO equivalent weight of 182.

Trimer 2A: The triisocyanurate of hexamethylene diisocyanate (HDI) commercially available from Bayer as Desmodur™ N 3390 with an NCO equivalent weight of 216.

Trimer 3: The triisocyanurate of isophorone diisocyanate (IPDI) commercially available from Bayer Corporation as Desmodur™ Z 4470 with an NCO equivalent weight of 353.

Table 1A, below, provides the properties of the soft polyols of NOP-1, NOP-2, CAPA 3091 (a trimethylolpropane initiated caprolactone polyol available from Perstorp Polyols (Toledo, Ohio), the hard polyol 1, a solution polymerized single stage acrylic polyol used in the examples, and soft polyol 1, an acrylic polyol synthesized by solution polymerization. Table 1B, below, provides the properties of other polyols, including Setalux™ 1152 SS-60 (Nuplex, Auckland, NZ) an acrylic polyol, Desmophen™ A365 B/X (Bayer) an acrylic polyol, Desmophen™ 670 BA (Bayer) a polyester polyol, Desmophen™ A160 (Bayer) an acrylic polyol were used as received. The glass transition temperatures of the polyester polyols varied from −24° C. to −69° C., while acrylic polyol glass transition temperatures were higher than 0° C.

TABLE 1A

Polyols Used in the Examples

| Properties | Polyol | | | | |
|---|---|---|---|---|---|
| | NOP-1 | NOP-2 | CAPA 3091 | Hard Polyol 1 | Soft Polyol 1 |
| Hydroxyl Value (mg KOH/g) | 260 | 194 | 183 | 140 | — |
| Molecular Weight | 820 | 867 | 920 | 5000 | 2000 |
| Glass Transition Temperature (° C.) | −45 | −56 | −69 | 20 | −24 |
| OH Functionality | 3.8 | 3.0 | 3.0 | — | 3.5 |

TABLE 1B

More Polyols Used in the Examples

| Properties | Polyol | | | |
|---|---|---|---|---|
| | Desmophen™ A365 B/X | Setalux™ 1152 | Desmophen™ A670 | Desmophen™ A160 |
| Molecular Weight (Mn) | 2450 | 2810 | 1420 | 3360 |
| Glass Transition Temperature (° C.) | 8 | 35 | −25 | 28 |
| OH Functionality | 6.4 | 6.9 | 3.6 | 5.1 |
| OHEW | 585 | 793 | 485 | 1062 |

Dibutyltin dilaurate (Tin-12) (Aldrich, Milwaukee, Wis.) was diluted to 10% weight in butyl acetate before using as the catalyst for Tables 10 to 13, and was diluted to 1% for Tables 14 and 15.

Tables 2-4, 8, 10, 12, and 14, below, provide the clearcoat formulations and Tables 5-7, 9, 11, 13 and 15, below provide the coating properties. All materials in Tables 2-4, 8, 10, 12 and 14 are listed in weight parts.

All formulations were made by simple mixing for 1 to 3 minutes, until homogeneous, in a clean dry glass jar the polyols, as one component, and the catalyst solution with the blends of polyisocyanate compositions as the other component. The formulations were then allowed to stand for 5 minutes to allow any air bubbles to dissipate and then coated on a clean and dry cold roll steel panel using a #52 wire wound rod, followed by curing at room temperature for seven (7) days to achieve a coating having a dry film thickness of approximately 50 microns.

For the formulations in Tables 10 and 12, below, wet coating films were allowed to flash at room temperature for 15 minutes, then cured for 30 min at 60° C. in oven and further cured for the indicated time at room temperature. The dry film thickness was controlled at 45±5 μm. Any glass substrates were pre-cleaned by washing with detergent solution and rinsing with deionized water. Tinplate substrates were pre-sanded with 400# sand paper and pre-cleaned with acetone.

As shown in Table 2A, below, the coating compositions of the present invention comprising a polyol blend with varying acrylic hard polyol/polyester soft polyol blends.

Tables 2A and 2B

Coating Formulations with Polyol Blends

TABLE 2A

Inventive Formulations

| Material | Example 1 (pbw) | Example 2 (pbw) | Example 3 (pbw) | Example 4 (pbw) |
|---|---|---|---|---|
| CAPA 3091 | 17.06 | NA | NA | NA |
| NOP-1 | NA | NA | NA | 33.02 |
| NOP-2 | NA | 13.15 | 33.02 | NA |
| Hard Polyol 1 | 21.3 | 36.85 | 16.98 | 16.98 |
| Trimer 1 | 18.0 | 22.27 | 27.67 | 27.67 |
| Trimer 3 | NA | NA | NA | NA |
| Trimer 2 | 9.47 | 11.72 | 14.56 | 14.56 |
| Solvent* | 27.8 | 29.82 | 41.12 | 42.37 |
| Catalyst Solution** | 0.56 | 0.75 | 0.75 | 075 |

Solvent* is a 50:50 blend, by weight, of Butyl Acetate and Ethyl 3-ethoxy propionate;
Catalyst Solution** is a 2% by weight solution of dibutyltin dilaurate in n-butyl acetate.

TABLE 2B

Comparative Formulations

| Material | Comparative Example 1 (pbw) | Comparative Example 2 (pbw) | Comparative Example 3 (pbw) | Comparative Example 4 (pbw) |
|---|---|---|---|---|
| NOP-1 | NA | NA | NA | 33.02 |
| NOP-2 | 22.72 | 13.15 | 33.02 | NA |
| Hard Polyol 1 | 28.4 | 36.85 | 16.98 | 16.98 |
| Trimer 3 | 24.41 | 22.65 | 28.13 | 35.7 |
| Trimer 2 | 12.63 | 11.72 | 14.55 | 18.47 |
| Solvent* | 36.74 | 32.5 | 41.97 | 45.85 |
| Catalyst Solution** | 0.75 | 0.75 | 0.75 | 0.75 |

Solvent*: A 50:50 blend, by weight, of Butyl Acetate and Ethyl 3-ethoxy propionate;
Catalyst Solution**: A 2% by weight solution of dibutyltin dilaurate in n-butyl acetate.

TABLE 3

Coating Formulations with A Soft Polyol

| Material | Example 5 (pbw) | Comparative Example 5 (pbw) | Comparative Example 6 (pbw) |
|---|---|---|---|
| CAPA 3091 | 35 | 35 | 40 |
| Trimer 1 | 41.7 | NA | NA |
| Trimer 3 | NA | 42.38 | NA |
| Trimer 2 | NA | NA | 25.06 |

TABLE 3-continued

Coating Formulations with A Soft Polyol

| Material | Example 5 (pbw) | Comparative Example 5 (pbw) | Comparative Example 6 (pbw) |
|---|---|---|---|
| Solvent* | 30.48 | 29.88 | 42.78 |
| Catalyst Solution** | 0.52 | 0.52 | 0.6 |

Solvent* is a 50:50 blend, by weight, of Butyl Acetate and Ethyl 3-ethoxy propionate; catalyst Solution** is a 2% by weight solution of dibutyltin dilaurate in n-butyl acetate solvent.

TABLE 4

Coating Formulations with Polyol Blends

| Material | Example 6 (pbw) | Example 7 (pbw) | Example 8 (pbw) |
|---|---|---|---|
| CAPA 3091 | 18.18 | 17.06 | 19.54 |
| Hard Polyol 1 | 22.72 | 21.3 | 24.43 |
| Trimer 1 | 28.8 | 18.0 | 10.32 |
| Trimer 2 | 5.05 | 9.47 | 11.99 |
| Solvent* | 27.57 | 27.8 | 30.44 |
| Catalyst Solution** | 0.6 | 0.56 | 0.64 |

Solvent* is a 50:50 blend, by weight, of Butyl Acetate and Ethyl 3-ethoxy propionate; Catalyst Solution** is a 2% by weight solution of dibutyltin dilaurate in n-butyl acetate solvent.

As shown in Tables 5A, below, the coating compositions of the present invention comprising a polyol blend with varying acrylic hard polyol/polyester soft polyol blends in Examples 1-4 give similar to better hardness and superior solvent resistance and scratch and mar resistance relative to comparable coating compositions, shown in Table 5B, below, comprising a 1:1 blend w/w of polyisocyanate compositions made from isocyanurates of IPDI and HDI, respectively, in Comparative Examples 1-4.

Tables 5A and 5B

Test Results

TABLE 5A

Inventive Results

| | Example 1 | Example 2 | Example 3 | Example 4 |
|---|---|---|---|---|
| Trimer (T) Mixtures[1] | T1/T2 (1:1) | T1/T2 (1:1) | T1/T2 (1:1) | T1/T2 (1:1) |
| Polyols (weight ratios) | Hard Polyol 1/ CAPA 3091 (1:1) | Hard Polyol 1/ NOP-2 (7:3) | Hard Polyol 1/ NOP-2 (3:7) | Hard Polyol 1/ NOP-1 (3:7) |
| Coating Properties | | | | |
| Pencil Hardness | F | 2H | F | H |
| Solvent Resistance | 196 | 132 | 200 | 200 |
| Scratch & Mar Resistance | 87 | 25 | 100 | 52 |

[1]T1 is Trimer 1, T2 is Trimer 2 and T3 is Trimer 3; all ratios are weight ratios.

TABLE 5B

Comparative Results

| | Comparative Example 1 | Comparative Example 2 | Comparative Example 3 | Comparative Example 4 |
|---|---|---|---|---|
| Trimer (T) Mixtures[1] | T3/T2 (1:1) | T3/T2 (1:1) | T3/T2 (1:1) | T3/T2 (1:1) |
| Polyols (weight ratios) | Hard Polyol 1/ CAPA 3091 (1:1) | Hard Polyol 1/ NOP-2 (7:3) | Hard Polyol 1/ NOP-2 (3:7) | Hard Polyol 1/ NOP-1 (3:7) |
| Coating Properties | | | | |
| Pencil Hardness | F | F | F | F |
| Solvent Resistance | 120 | 95 | 100 | 185 |
| Scratch & Mar Resistance | 28 | 8 | 40 | 17 |

[1]T1 is Trimer 1, T2 is Trimer 2 and T3 is Trimer 3; all ratios are weight ratios.

As shown in Table 6, below, a mixture of a polyester soft polyol and a polyisocyanate composition from trimerizing bis(isocyanatomethyl)-cyclohexane (Trimer 1) provides a superior balance of hardness, solvent resistance and scratch and mar resistance as illustrated in Example 5 when compared to the same polyol mixed with Trimer 2 (from hexamethylene diisocyanate) or Trimer 3 (from isophorone diisocyanate) which appear, respectively, in Comparative Examples 5 and 6.

TABLE 6

Test Results with Single Trimer Compositions

| | Example 5 | Comparative Example 5 | Comparative Example 6 |
|---|---|---|---|
| Trimer | Trimer 1 | Trimer 3 | Trimer 2 |
| Polyols | CAPA 3091 | CAPA 3091 | CAPA 3091 |
| Coating Properties | | | |
| Pencil Hardness | F | F | B |
| Solvent Resistance | 198 | 84 | 101 |
| Scratch & Mar Resistance | 50 | 12 | 100 |

TABLE 7

Test Results from Table 6 Formulations

| | Example 6 | Example 7 | Example 8 |
|---|---|---|---|
| Trimer Mixtures[1] | Trimer 1/ Trimer 2 (3:1) | Trimer 1/ Trimer 2 (1:1) | Trimer 1/ Trimer 2 (1:3) |
| Polyols[2] | Hard Polyol 1/ CAPA 3091 (1:1) | Hard Polyol 1/ CAPA 3091 (1:1) | Hard Polyol 1/ CAPA 3091 (1:1) |
| Konig Hardness | 105 | 52 | 16 |
| Solvent Resistance | 165 | 196 | 86 |

[1]Weight ratios of the various polyisocyanate isocyanurate compositions are given;
[2]All are weight ratios.

As shown in Table 7, above, the coating compositions of the present invention comprising a 1:1 acrylic hard polyol/polyester soft polyol blend with varying blend ratios of Trimer 1 to Trimer 2 give better hardness and solvent resistance at the higher ratio of Trimer 1 to Trimer 2, as in Examples 6-8.

Table 8 provides pigmented (deeptone green) coating formulations with the polyisocyanate composition of isocyanurates from bis(isocyanatomethyl)-cyclohexane and Table 9 provides the coating properties of those coatings.

The coating formulations were made by combining the NOP solution, butyl acetate, dibutyltin dilaurate catalyst solution, flow aid, anti-silk aid, UV absorber, light stabilizer, and green and white colorant dispersions as listed in Table 8 in a 120 ml glass jar and mixing by shaking vigorously for 30 seconds by hand. The polyisocyanate trimers as listed in Table 8 are then added and mixed by shaking vigorously for 30 seconds by hand. Coatings were formed by casting films with a wet film applicator with a 7 mil gap on a aluminum panel and curing at 25° C. and 50% relative humidity for two weeks. The resulting coatings had a dry film thickness of approximately 60 microns.

TABLE 8

Formulations With A Soft Polyol

| Material | Example 9 (pbw) | Example 10 (pbw) | Comparative Example 7 (pbw) | Comparative Example 8 (pbw) |
|---|---|---|---|---|
| NOP-1 solution* | 33.6 | 0 | 33 | 0 |
| NOP-2 solution** | 0 | 31.8 | 0 | 31.25 |
| Butyl Acetate | 0 | 3.2 | 0 | 2.6 |
| Dibutyltin Dilaurate; 1% in butyl Acetate | 0.74 | 0.74 | 0.74 | 0.74 |
| Byk 333 Flow Aid | 0.18 | 0.18 | 0.18 | 0.18 |
| Raybo 3 Anti-Silk aid | 0.02 | 0.02 | 0.02 | 0.02 |
| Tinuvin 292 hindered amine light stabilizer | 0.5 | 0.5 | 0.5 | 0.5 |
| Tinuvin 1130 UV absorber | 0.5 | 0.5 | 0.5 | 0.5 |
| UCD 5105HS Green Pigment Dispersion[1] | 9.7 | 9.7 | 9.7 | 9.7 |
| UCD 1106HS White Pigment Dispersion[2] | 1.9 | 1.9 | 1.9 | 1.9 |
| Trimer 1 | 39 | 34 | 0 | 0 |
| Trimer 3 | 0 | 0 | 40.3 | 35.3 |

*65% weight solids in 1:1:1 blend of acetone:tButyl acetate:p-Chlorobenzotrifluoride;
**80% weight solids in 1:1:1 blend of acetone:tButyl acetate:PCBTF;
[1]Phthalocyanine green solvent dispersion;
[2]TiO$_2$ solvent dispersion

TABLE 9

Test Results

| | Example 9 | Example 10 | Comparative Example 7 | Comparative Example 8 |
|---|---|---|---|---|
| Trimer Composition | Trimer 1 | Trimer 1 | Trimer 3 | Trimer 3 |
| Polyols | NOP-1 | NOP-2 | NOP-1 | NOP-2 |
| Coating Properties | | | | |
| Pencil Hardness | F | F | F | F |
| MEK Double Rub - 1$^{st}$ break through | 400 | 185 | 415 | 105 |
| Direct Impact (kg-cms) | 63 | 160 | 23 | 160 |
| QUV(B) Initial Gloss 60°/20° | 88.7/81.5 | 89.1/81.5 | 91.0/85.3 | 90.5/85.3 |
| Gloss after 1411 hr | 88.4/75.4 | 92.7/84.9 | 27/1.9 | 84.7/69.9 |

As shown in Table 9, above, inventive coating compositions based on a 100% NOP-1 polyester polyol with 100% Trimer 1 in Example 9 gives similar hardness and MEK rub solvent resistance as the same NOP-1 polyol with 100% Trimer 3 (from IPDI) in Comparative Example 7 but gives superior impact resistance and gloss retention in accelerated QUV weathering. The coatings from compositions based on a lower hydroxyl functional 100% NOP-2 polyester polyol with 100% of Trimer 1 in Example 10 exhibits similar hardness and similar excellent impact resistance as the same coatings made with 100% IPDI trimer in and Comparative Example 8; however, the coatings containing 100% Trimer 1 have better solvent resistance and QUV weathering and, remarkably, exhibit no gloss loss after 1411 hours of QUV (B) exposure.

In Table 10, below, to better reflect the differences of coating films, only one layer of clear coat was applied to a substrate. Gloss and DoI were measured on Leneta plastic substrates. As the roughness of Leneta substrates is high (gloss of the substrate without coating is 0), the gloss and DoI value was lower than those measured on coating films with basecoat under it.

As shown in Table 11, below, the inventive compositions of Examples 11 and 12 containing an isocyanurate of bis-(isocyanatomethyl)cyclohexane showed higher Gel content and pencil hardness than the same compositions of Comparative Examples 9 and 10, respectively, having a polyisocyanate containing an isocyanurate of IPDI.

TABLE 10

Formulations of Blends$^a$

| | Comparative Example 9 | Example 11 | Comparative Example 10 | Example 12 |
|---|---|---|---|---|
| Trimer Mixture$^{b,1}$ | T2A/T3 (50:50) | T1/T2A (50:50) | T2A/T3 (50:50) | T1/T2A (50:50) |
| Polyol Mixture$^b$ | Setalux-1152/ Des 670 (70:30) | Setalux-1152/ Des 670 (70:30) | Des A365/ Des 670 (70:30) | Des A365/ Des 670 (70:30) |
| Setalux 1152 | 35.00 | 35.00 | 40.00 | 40.00 |
| Desmophen 670 | 9.56 | 9.56 | 13.93 | 13.93 |
| Desmodur N3390 | 7.68 | 7.78 | 11.69 | 11.87 |
| Desmodur Z4470 | 9.87 | 0.00 | 15.03 | 0.00 |
| Trimer 1 | 0.00 | 10.01 | 0.00 | 15.26 |

TABLE 10-continued

Formulations of Blends[a]

| | Comparative Example 9 | Example 11 | Comparative Example 10 | Example 12 |
|---|---|---|---|---|
| Solvent[c] | 10.00 | 10.00 | 23.25 | 23.42 |
| Catalyst[d] | 0.039 | 0.040 | 0.06 | 0.06 |

[a]Equivalent ratio of isocyanate to polyol is 1:1, solid content is controlled to be 56%, the catalyst amount is 100 ppm on the solid content of final coating system;
[b]Weight ratio of the solids in the polyisocyanates;
[c]50/50 by weight of xylene/butyl acetate;
[d]The catalyst was diluted to 10% solution in butyl acetate.
[1]T1 is Trimer 1, T2 is Trimer 2A and T3 is Trimer 3.

TABLE 11

Test Results From Formulations of Table 10

| Coating Property | Comparative Example 9 | Example 11 | Comparative Example 10 | Example 12 |
|---|---|---|---|---|
| Pencil hardness (24 hr[b]) | F | 2H | B | F |
| Konig hardness (24 hrs[b]) | 33 | 42 | 14 | 20 |
| Pencil hardness (7 days[c]) | 4H | 4H | 2H | 4H |
| Konig hardness (7 days[c]) | 82 | 63 | 42 | 40 |
| Gel content (7 days[c]) | 95 | 98 | 94 | 98 |
| MEK DRs (7 days[c]) | >200 | >200 | >200 | >200 |
| Impact resistance (kg · cm) | 50 | 70 | 100 | 65 |
| Gloss at 20° C. (%) | 87.8 | 91.0 | NA | NA |
| DoI (%) | 76.3 | 72.9 | NA | NA |

[b]Curing condition: 30 min @60° C. + 24 hr @room temperature;
[c]Curing condition: 30 min @60° C. + 7 days @room temperature.

In Table 11, above, the composition of Example 11 also showed good Konig hardness and greatly improved impact resistance when a harder hard polyol, Setalux™-1152 was formulated with the polyisocyanate compositions containing isocyanurates of bis-(isocyanatomethyl)cyclohexane and of HDI.

TABLE 12

Formulations with a Single Soft Polyol[a]

| | Comparative Example 11 | Comparative Example 12 | Example 13 | Comparative Example 13 | Example 14 |
|---|---|---|---|---|---|
| Trimer[b,1] | T2a | T3 | T1 | T2A/T3 (50:50) | T1/T2A (50:50) |
| Polyols[b] | Soft Polyol 1 | Soft Polyol 1 | Soft Polyol 1 | Soft Polyol 1 | Soft Polyol 1 |
| Soft Polyol 1 | 40.00 | 40.00 | 40.00 | 40.00 | 40.00 |
| Desmodur N3390 | 11.05 | 0.00 | 0.00 | 6.21 | 6.30 |
| Desmodur Z4470 | 0.00 | 18.21 | 0.00 | 7.98 | 0.00 |
| T1 | 0.00 | 0.00 | 18.84 | 0.00 | 8.10 |
| Solvent[c] | 18.85 | 16.69 | 16.85 | 17.91 | 17.99 |
| Catalyst[d] | 0.4 | 0.4 | 0.4 | 0.4 | 0.4 |

[a]Equivalent ratio of isocyanate to polyol is 1:1, solid content is controlled to be 56%, the catalyst amount is 100 ppm on the solid content of final coating system;
[b]Weight ratio of the solids in the polyisocyanates;
[c]50/50 by weight of xylene/butyl acetate;
[d]The catalyst was diluted to 10% solution in butyl acetate;
[1]T1 is Trimer 1, T2 is Trimer 2A and T3 is Trimer 3; all ratios are weight ratios.

TABLE 13

Test Results From Formulations of Table 12

| | Comparative Example 11 | Comparative Example 12 | Example 13 | Comparative Example 13 | Example 14 |
|---|---|---|---|---|---|
| Konig hardness (24 hrs[b]) | 2 | 16 | 11 | 6 | 4 |
| MEK DRs passed (24 hr[b]) | 20 | 7 | 14 | 6 | 25 |
| Pencil hardness (7 days[c]) | H | HB | 2H | H | 2H |
| Konig hardness (7 days[c], times) | 23 | 53 | 45 | 38 | 39 |
| Gel content (7 days[c]) | 80.7 | NA* | 71.8 | 80.0 | 83.1 |
| MEK DRs (7 days[c]) | >200 | 30 | 90 | 190 | >200 |

TABLE 13-continued

Test Results From Formulations of Table 12

| | Comparative Example 11 | Comparative Example 12 | Example 13 | Comparative Example 13 | Example 14 |
|---|---|---|---|---|---|
| Impact resistance (kg · cm) | 65 | 30 | 30 | 60 | 60 |
| Gloss at 20° C. (%) | 79.8 | 82.5 | 83.0 | 82.5 | 83.1 |

[a]Equivalent ratio of isocyanate to polyol is 1:1, solid content is controlled to be 56%, the catalyst amount is 100 ppm on the solid content of final coating system;
[b]Weight ratio of the solids in the trimers;
[c]50/50 by weight of xylene/butyl acetate;
[d]The catalyst was diluted to 10% solution in butyl acetate;
*The film is too brittle to measure.

As shown in Table 13, above, coatings in Example 14 made from soft polyols and polyisocyanate compositions containing isocyanurates of bis-(isocyanatomethyl)cyclohexane and of HDI showed higher gel content and impact resistance, as well as better MEK resistance than IPDI trimer in Comparative Example 13. The gloss of the coating of Example 13 was improved versus those of Comparative Examples 11 and 12, respectively, containing polyisocyanate compositions containing isocyanurates of HDI and IPDI. The hardness of the Example 13 coating was far better than that of Comparative Example 11 (containing isocyanurates of HDI); and the MEK rubs in the Example 13 coating were far better than that of Comparative Example 12 (containing isocyanurates of IPDI).

TABLE 14

Formulations of Polyisocyanate Mixtures of Isocyanurates and Polyol Blends

| | Comparative Example 14 | Example 15 |
|---|---|---|
| Trimer Mixtures[a] | T2/T3 (50/50) | T1/T2 (50/50) |
| Polyols[a] (weight ratios) | Desmophen A160/ Soft Polyol 1 (50/50) | Desmophen A160/ Soft Polyol 1 (50/50) |
| Soft Polyol 1 | 20.00 | 20.00 |
| Desmophen A160 | 24.33 | 24.33 |
| Desmodur N3390 | 5.86 | 5.95 |
| Desmodur Z4470 | 7.54 | 0.00 |
| Trimer 1 | 0.00 | 7.65 |
| Solvent[b] | 13.25 | 13.33 |
| Catalyst[c] | 0.40 | 0.40 |

[a]Weight ratio of the solids in the polyisocyanates;
[b]50/50 by weight of xylene/butyl acetate;
[c]100 ppm based on the total solids in the formulations, the catalyst was diluted to 1% solution in butyl acetate.

TABLE 15

Performances of Formulations in Table 14

| | Comparative Example 14 | Example 15 |
|---|---|---|
| Pendulum hardness (24 hrs[b], times) | 32 | 26 |
| MEK DRs passed (24 hr[b]) | 60 | 75 |
| Pencil hardness (7 days[c]) | 2H | 2H |
| Pendulum hardness (7 days[c], times) | 58 | 71 |
| Gel content (7 days[c]) | 81.3 | 87.1 |
| MEK DRs (7 days[c]) | >200 | >200 |
| Impact resistance (kg · cm) | 65 | 55 |
| Gloss at 20° C. (%) | 87.4 | 86.2 |

[b]Curing condition: 30 min @60° C. + 24 hr @room temperature;
[c]Curing condition: 30 min @60° C. + 7 days@room temperature.

The coatings of Example 15, as shown in Table 15, above, made from polyisocyanate compositions containing isocyanurates of bis-(isocyanatomethyl)cyclohexane with a polyisocyanate composition containing isocyanurates of HDI showed higher gel content and impact resistance, better MEK resistance than the same compositions of Comparative Example 14 made with polyisocyanate compositions containing isocyanurates of IPDI and isocyanurates of HDI.

We claim:

1. A two-component polyurethane composition comprising:
    as one component, one or more polyisocyanate compositions of an isocyanurate of bis(isocyanatomethyl)cyclohexane and one or more polyisocyanate composition of an isocyanurate of 1,6-hexamethylene diisocyanate (HDI trimer); and,
    as a second component, a blend of one or more hard polyols having a glass transition temperature (Tg) of 0° C. or above, and one or more soft polyols having a Tg of −20° C. or below and having a hydroxyl functionality of 2.5 to 5.0 and a number average molecular weight of from 500 to 3,000, wherein in the blend, the weight ratio of the total soft polyol to the total hard polyol ranges from 10:90 to 99.9:0.1.

2. The composition as claimed in claim 1, wherein in the polyisocyanate component, the weight ratio of one or more composition of an isocyanurate of bis(isocyanatomethyl)cyclohexane to one or more composition of an isocyanurate of 1,6-hexamethylene diisocyanate (HDI) is from 95:5 to 10:90.

3. The composition as claimed in claim 1, wherein the polyisocyanate composition is formed from a mixture of isomers of bis-(isocyanatomethyl) cyclohexanes.

4. The composition as claimed in claim 1, wherein in the polyol blend component, the weight ratio of the soft polyol to the hard polyol ranges from 20:80 to 80:20.

5. The composition as claimed in claim 1, wherein the one or more soft polyol has a Tg of −30° C. or below.

6. The composition as claimed in claim 1, wherein the one or more soft polyol has a hydroxyl functionality of 2.9 to 4.0.

7. The composition as claimed in claim 1, wherein the soft polyol is a polyester polyol.

8. The composition as claimed in claim 7, wherein the soft polyol is an oil based polyester polyol having a non-reactive, hydrophobic pendant group.

9. A coating made from the composition as claimed in claim 1.

10. The composition as claimed in claim 4, wherein in the polyol blend component, the weight ratio of the soft polyol to the hard polyol ranges from 30:70 to 70:30.

\* \* \* \* \*

UNITED STATES PATENT AND TRADEMARK OFFICE
CERTIFICATE OF CORRECTION

PATENT NO.        : 8,802,771 B2
APPLICATION NO.   : 13/297388
DATED             : August 12, 2014
INVENTOR(S)       : Argyropoulos et al.

Page 1 of 1

It is certified that error appears in the above-identified patent and that said Letters Patent is hereby corrected as shown below:

In the Claims,

In column 19, line 18, delete "impact resistance" and replace with --pencil hardness--.

In column 20, line 19, delete "impact resistance" and replace with --7 day pendulum hardness--.

In column 20, lines 19 through 20, delete "better MEK resistance" and replace with --and better 24 hour MEK resistance--.

Signed and Sealed this
Eighteenth Day of November, 2014

Michelle K. Lee
*Deputy Director of the United States Patent and Trademark Office*